US009491480B2

(12) United States Patent
Lim et al.

(10) Patent No.: US 9,491,480 B2
(45) Date of Patent: Nov. 8, 2016

(54) MOTION VECTOR ENCODING/DECODING METHOD AND APPARATUS USING A MOTION VECTOR RESOLUTION COMBINATION, AND IMAGE ENCODING/DECODING METHOD AND APPARATUS USING SAME

(75) Inventors: Jeongyeon Lim, Gyeonggi-do (KR); Sunyeon Kim, Seoul (KR); Jaehoon Choi, Gyeonggi-do (KR); Gyumin Lee, Gyeonggi-do (KR); Jongki Han, Seoul (KR); Yunglyul Lee, Seoul (KR); Joohee Moon, Seoul (KR); Haekwang Kim, Seoul (KR); Byeungwoo Jeon, Gyeonggi-do (KR); Chanwon Seo, Incheon (KR)

(73) Assignee: SK TELECOM CO., LTD., Seoul (KR)

( * ) Notice: Subject to any disclaimer, the term of this patent is extended or adjusted under 35 U.S.C. 154(b) by 804 days.

(21) Appl. No.: 13/583,533

(22) PCT Filed: Mar. 4, 2011

(86) PCT No.: PCT/KR2011/001492
§ 371 (c)(1),
(2), (4) Date: Nov. 21, 2012

(87) PCT Pub. No.: WO2011/111954
PCT Pub. Date: Sep. 15, 2011

(65) Prior Publication Data
US 2013/0070846 A1   Mar. 21, 2013

(30) Foreign Application Priority Data

Mar. 8, 2010   (KR) .................... 10-2010-0020439

(51) Int. Cl.
*H04N 19/523*   (2014.01)
*H04N 19/567*   (2014.01)
(Continued)

(52) U.S. Cl.
CPC .............. *H04N 19/517* (2014.11); *H04N 7/32* (2013.01); *H04N 19/523* (2014.11); *H04N 19/567* (2014.11)

(58) Field of Classification Search
CPC ......... H04N 7/32; H04N 7/26; H04N 19/517
See application file for complete search history.

(56) References Cited

U.S. PATENT DOCUMENTS 8,094,716 B1 * 1/2012 Chen .................... H04N 19/147
  375/240.01
8,619,859 B2 * 12/2013 Lee ........................ H04N 19/56
  375/240

(Continued)

FOREIGN PATENT DOCUMENTS

JP        2009027762       2/2009
KR    10-2004-0098422    11/2004
(Continued)

OTHER PUBLICATIONS

Korean Office Action dated Dec. 10, 2013.
(Continued)

*Primary Examiner* — Jay Patel
*Assistant Examiner* — Irfan Habib
(74) *Attorney, Agent, or Firm* — Hauptman Ham, LLP

(57) ABSTRACT

The present disclosure provides a motion vector encoding/decoding method and apparatus using a motion vector resolution combination, and an image encoding/decoding method and apparatus using the same. A motion vector encoding apparatus include: an encoding cost calculator for calculating an encoding cost according to a motion vector resolution for each motion vector resolution combination including one or more motion vector resolutions; a resolution combination determiner for selecting a motion vector resolution combination by using the encoding cost calculated for each motion vector resolution combination; and a motion information encoder for outputting encoded motion vector data generated by encoding a motion vector determined according to the motion vector resolution combination selected, as a bitstream. Accordingly, an efficient motion vector resolution combination is selected adaptively and a motion vector is determined and decoded based on the motion vector resolution combination, thus making it possible to improve compression efficiency.

20 Claims, 12 Drawing Sheets

(51) Int. Cl.
  *H04N 19/517*  (2014.01)
  *H04N 19/50*   (2014.01)

(56) References Cited

U.S. PATENT DOCUMENTS

| | | | | |
|---|---|---|---|---|
| 8,929,448 | B2* | 1/2015 | Youn | H04N 19/139 348/699 |
| 2002/0090027 | A1* | 7/2002 | Karczewicz | H04N 21/23406 375/240.01 |
| 2004/0131121 | A1* | 7/2004 | Dumitras | H04N 19/00 375/240.16 |
| 2005/0123038 | A1* | 6/2005 | Otsuka | H04N 19/176 375/240.03 |
| 2005/0135484 | A1* | 6/2005 | Lee | H04N 19/176 375/240.16 |
| 2006/0008008 | A1* | 1/2006 | Song | H04N 19/56 375/240.16 |
| 2008/0198934 | A1* | 8/2008 | Hong | H04N 19/56 375/240.22 |
| 2008/0212678 | A1* | 9/2008 | Booth | H04N 19/557 375/240.16 |
| 2008/0253457 | A1* | 10/2008 | Moore | H04N 19/52 375/240.16 |
| 2009/0257489 | A1* | 10/2009 | Karczewicz | H04N 19/126 375/240.03 |
| 2009/0324113 | A1* | 12/2009 | Lu | H04N 19/147 382/234 |
| 2011/0013692 | A1* | 1/2011 | Cohen | H04N 19/139 375/240.02 |
| 2011/0058605 | A1* | 3/2011 | Ma | H04N 19/176 375/240.02 |
| 2011/0103473 | A1* | 5/2011 | Li | H04N 19/176 375/240.12 |
| 2011/0170596 | A1* | 7/2011 | Shi et al. | 375/240.16 |

FOREIGN PATENT DOCUMENTS

| | | |
|---|---|---|
| KR | 10-2006-0004060 | 1/2006 |
| KR | 10-2006-0069811 | 6/2006 |

OTHER PUBLICATIONS

International Search Report mailed Nov. 1, 2011 for PCT/KR2011/001492.

* cited by examiner ic MOTION VECTOR ENCODING/DECODING METHOD AND APPARATUS USING A MOTION VECTOR RESOLUTION COMBINATION, AND IMAGE ENCODING/DECODING METHOD AND APPARATUS USING SAME

CROSS REFERENCE TO RELATED APPLICATION

This application claims the priority of Korean Patent Application No. 10-2010-0020439, filed on Mar. 8, 2010 in the KIPO (Korean Intellectual Property Office). Further, this application is the National Phase application of International Application No. PCT/KR2011/001492 filed Mar. 4, 2011, which designates the United States and was published in Korean.

TECHNICAL FIELD

The present disclosure relates to a motion vector encoding/decoding method and apparatus using a motion vector resolution combination, and a video encoding/decoding method and apparatus using the same. More particularly, the present disclosure relates to a method and apparatus for improving compression efficiency by selecting an efficient motion vector resolution combination adaptively in video encoding and determining and encoding a motion vector based on the motion vector resolution combination. In addition, the present disclosure relates to a method and apparatus for improving image reconstruction efficiency by determining and decoding a motion vector adaptively according to a motion vector resolution combination selected by receiving a bitstream from a motion vector encoding apparatus.

BACKGROUND

The statements in this section merely provide background information related to the present disclosure and may not constitute prior art.

H.264/AVC is a video codec standard providing the highest compression rate among the video codec standards up to now. In order to improve compression efficiency, the H.264/AVC standard prediction-encodes an image by using intra prediction reflecting directivity, integer transform in unit of 4×4 pixels, block modes having various sizes of 16×16 pixels to 4×4 pixels, or a deblocking filter. In addition, in order to find a more accurate motion vector, the H.264/AVC standard performs motion estimation by interpolating an image in units of a ½ pixel to ¼ pixel.

However, as described above, since by the H.264/AVC standard, motions vectors of various resolutions are determined and encoded by estimating a motion at various resolutions such as a ½ pixel unit and a ¼ pixel unit, a long codeword is used to encode a motion vector with a resolution of ½ pixel unit or ¼ pixel unit. Therefore, the number of bits required to encode a small motion vector increases, and the number of bits of a bitstream encoded increases, thus degrading compression efficiency.

In addition, since motion vector decoding is performed adaptively to motion vector encoding, when the compression efficiency of motion vector encoding is degraded, it is difficult to expect high efficiency in motion vector decoding.

DISCLOSURE

Technical Problem

Therefore, to solve the above-mentioned problems, the present disclosure seeks to improve compression efficiency by selecting an efficient motion vector resolution combination adaptively and determining and encoding a motion vector based on the motion vector resolution combination.

In addition, the present disclosure seeks to improve video reconstruction efficiency by reconstructing a motion vector by reconstructing a motion vector resolution combination adaptively based on a bitstream, in the case of selecting a motion vector resolution combination adaptively and determining and encoding a motion vector based on the motion vector resolution combination.

SUMMARY

An embodiment of the present disclosure provides a motion vector encoding apparatus including: an encoding cost calculator for calculating an encoding cost according to a motion vector resolution for each motion vector resolution combination including one or more motion vector resolutions; a resolution combination determiner for selecting a motion vector resolution combination by using the encoding cost calculated for each motion vector resolution combination; and a motion information encoder for outputting encoded motion vector data generated by encoding a motion vector determined according to the motion vector resolution combination selected, as a bitstream.

Another embodiment of the present disclosure provides a video encoding apparatus including: a predictor for determining a motion vector of an image according to a motion vector resolution for each motion vector resolution combination including one or more motion vector resolutions, and generating a predicted image of the image by using the motion vector determined; a subtracter for generating a residual image by subtracting the predicted image from the image; a transformer/quantizer for transforming/quantizing the residual image; and an encoder for generating encoded image data for each motion vector resolution combination by encoding the transformed/quantized residual image, calculating an encoding cost of the encoded image data for each motion vector resolution combination, selecting a motion vector resolution combination by using the encoding cost of the encoded image data for each motion vector resolution combination, and outputting encoded image data encoded by using a motion vector determined according to a motion vector resolution of the motion vector resolution combination selected.

Yet another embodiment of the present disclosure provides a motion vector decoding apparatus including: a resolution combination reconstructor for reconstructing a motion vector resolution combination by decoding resolution combination index data extracted from a bitstream; and a motion vector reconstructor for reconstructing a motion vector by decoding encoded motion vector data extracted from the bitstream according to the motion vector resolution combination reconstructed.

Yet another embodiment of the present disclosure provides a video decoding apparatus including: a decoder for reconstructing a motion vector by decoding encoded motion vector data extracted from a bitstream according to a motion vector resolution combination reconstructed by decoding resolution combination index data extracted from the bitstream, and reconstructing a transformed/quantized residual image by decoding encoded image data extracted from the bitstream; an inverse quantizer/transformer for reconstructing a residual image by inverse-quantizing/transforming the transformed/quantized residual image; a predictor for generating a predicted image of an image by using the motion vector reconstructed; and an adder for reconstructing the image by adding the residual image and the predicted image.

Yet embodiment of the present disclosure provides a motion vector encoding method including: calculating an encoding cost according to a motion vector resolution for each motion vector resolution combination including one or more motion vector resolutions; selecting a motion vector resolution combination by using the encoding cost calculated for each motion vector resolution combination; and outputting encoded motion vector data generated by encoding a motion vector determined according to the motion vector resolution combination selected, as a bitstream.

Yet embodiment of the present disclosure provides a video encoding method including: determining a motion vector of an image according to a motion vector resolution for each motion vector resolution combination including one or more motion vector resolutions; generating a predicted image of the image by using the motion vector determined; generating a residual image by subtracting the predicted image from the image; transforming/quantizing the residual image; generating encoded image data for each motion vector resolution combination by encoding the transformed/quantized residual image; calculating an encoding cost of the encoded image data for each motion vector resolution combination; selecting a motion vector resolution combination by using the encoding cost of the encoded image data for each motion vector resolution combination; and outputting a bitstream including encoded image data encoded by using a motion vector determined according to a motion vector resolution of the motion vector resolution combination selected.

Yet embodiment of the present disclosure provides a motion vector decoding method including: reconstructing a motion vector resolution combination by decoding resolution combination index data extracted from a bitstream; and reconstructing a motion vector by decoding encoded motion vector data extracted from the bitstream according to the motion vector resolution combination reconstructed.

Yet another embodiment of the present disclosure provides a video decoding method including: reconstructing a motion vector by decoding encoded motion vector data extracted from a bitstream according to a motion vector resolution combination reconstructed by decoding resolution combination index data extracted from the bitstream; reconstructing a transformed/quantized residual image by decoding encoded image data extracted from the bitstream; reconstructing a residual image by inverse-quantizing/transforming the transformed/quantized residual image; generating a predicted image of an image by using the motion vector reconstructed; and reconstructing the image by adding the residual image and the predicted image.

Advantageous Effects

According to the present disclosure as described above, an efficient motion vector resolution combination is selected adaptively and a motion vector is determined and decoded based on the motion vector resolution combination, thus making it possible to improve compression efficiency.

In addition, when a motion vector resolution combination is selected adaptively and a motion vector is determined and encoded based on the motion vector resolution combination, a motion vector is reconstructed by reconstructing a motion vector resolution combination adaptively based on a bitstream, thus making it possible to improve image reconstruction efficiency.

DETAILED DESCRIPTION

Figure 1:
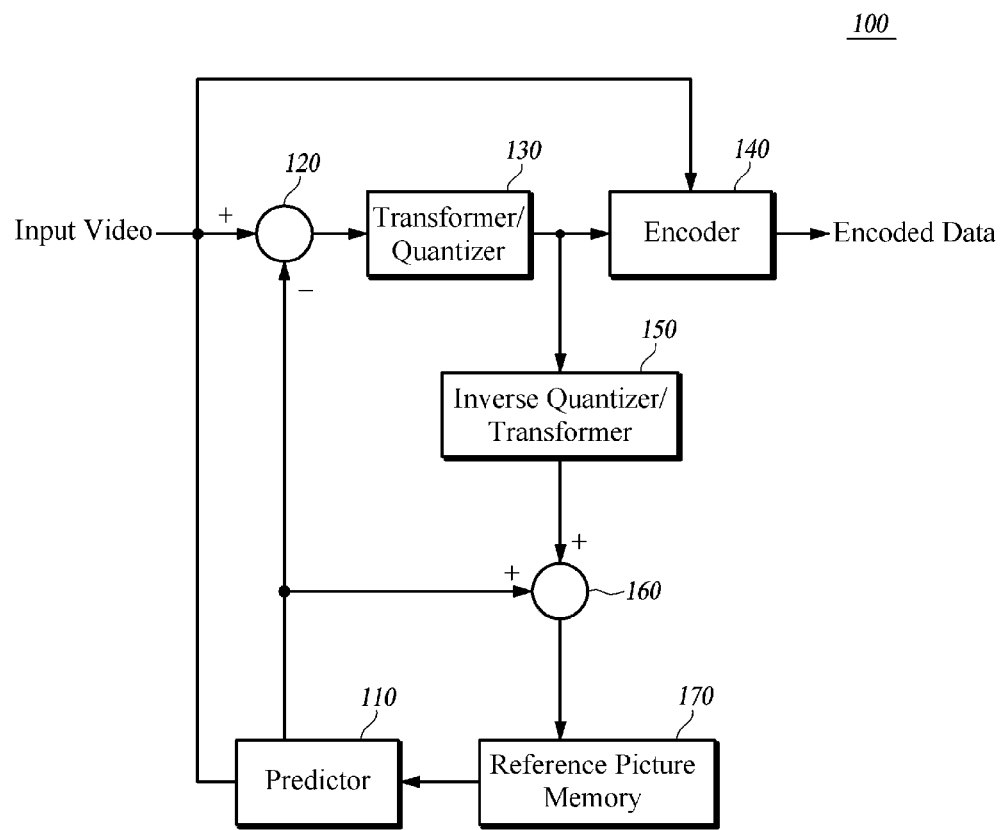
FIG. 1 is a block diagram illustrating a schematic configuration of an image encoding apparatus according to an embodiment of the present disclosure.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A motion vector encoding apparatus, a motion vector decoding apparatus, an image encoding apparatus, and an image decoding apparatus to be described below may be a user terminal such as a personal computer (PC), a notebook or laptop computer, a personal digital assistant (PDA), a portable multimedia player (PMP), a PlayStation Portable (PSP), or a mobile communication terminal, or a server terminal such as an application server or a service server, and represent a variety of apparatuses equipped with, for example, a communication device such as a modem for performing communications between various devices or wired/wireless communication networks, a memory for storing various programs for encoding/decoding a motion vector or encoding/decoding an image and relevant data, and a microprocessor for executing the programs to perform operations and controls.

In addition, the motion vector or the image encoded into a bitstream by the motion vector encoding apparatus or the image encoding apparatus may be transmitted in real time or non-real-time to the motion vector decoding apparatus or the image decoding apparatus where it is decoded and reconstructed as the motion vector or the image after being transmitted through a wired/wireless communication network such as the Internet, a short range wireless communication network, a wireless LAN network, a WiBro (Wireless Broadband, also known as WiMax) network, or a mobile communication network, or through a communication interface such as a cable or a USB (universal serial bus).

In general, a video image includes a series of pictures, and each picture is divided into predetermined regions such as blocks. When an image is divided into blocks, the blocks are classified into an intra block and an inter block according to encoding methods. The intra block is a block encoded by intra prediction encoding. The intra prediction encoding is a method that generates a predicted block by predicting a pixel of a current block by using pixels of blocks that are previously encoded/decoded/reconstructed in a current picture that is currently encoded, and encodes a differential value thereof with respect to the pixel of the current block. The inter block is a block encoded by inter prediction encoding. The inter prediction encoding is a method that generates a predicted block by predicting a current block in a current picture with reference to one or more previous pictures or next pictures, and encodes a differential value thereof with respect to the current block. Herein, a picture referred to in order to encode/decode a current picture is called a reference picture.

FIG. 1 is a block diagram illustrating a schematic configuration of an image encoding apparatus according to an embodiment of the present disclosure.

For encoding an image, an image encoding apparatus 100 according to an embodiment of the present disclosure may include a predictor 110, a subtracter 120, a transformer/quantizer 130, an encoder 140, an inverse quantizer/transformer 150, an adder 160, and a reference picture memory 170.

The predictor 110 determines a motion vector of an image according to a motion vector resolution for each motion vector resolution combination including one or more motion vector resolutions, and generates a predicted image of the image by using the motion vector determined. Specifically, the predictor 110 estimates a motion of a block to be encoded in an input image (hereinafter referred to as a current block), determines motion information including a reference frame index and a motion vector of the current block, and generates a predicted block of the current block by compensating a motion of the current block by using the determined motion information of the current block.

In addition, the predictor 110 may estimate an additional motion vector with a motion vector resolution, which is not included in a motion vector resolution combination selected by the encoder 140, among available motion vector resolutions, and generate a predicted image by using the motion vector estimated. In this case, the predictor 110 may estimate a motion vector of a motion vector resolution in units of a pixel, which is not included in a motion vector resolution combination, by template matching. Herein, the template matching is a method that estimates a motion vector of a current block by using pixels that are previously encoded/decoded/reconstructed, among neighboring pixels of the current block (or adjacent pixels among neighboring pixels) to be encoded. A method of estimating an additional motion vector by template matching will be described later in detail with reference to FIGS. 5 and 6.

In addition, the predictor 110 may determine motion information in units of a block and perform a predicted block generation operation in encoding units (e.g., block, slice, picture, and group of pictures (GOP)). An image including predicted blocks generated by performing a predicted block generation operation in encoding units may be generated as a predicted image. For example, if an encoding unit is a slice, the predictor 110 may determine a motion vector by estimating a motion of each block in a slice, and generate a predicted image by collecting a predicted block, which is generated by using the motion vector determined, in unit of a slice. Thus, in an embodiment of the present disclosure, an input image may be an image of a predetermined encoding unit included in a video image (e.g., an image corresponding to a slice in a picture), and a predicted image may be an image of a predetermined encoding unit including predicted blocks generated by predicting blocks in an input image (e.g., a slice image including predicted blocks).

In addition, each predicted image generated by the predictor 110 may be generated according to a motion vector resolution for each motion vector resolution combination. Specifically, since the predictor 110 determines a motion vector of each block in an input image according to a motion vector resolution for each motion vector resolution combination, generates predicted blocks by using the motion vector and generates a predicted image by collecting the predicted blocks, predicted images may be generated as many as the number of motion vector resolution combinations. In addition, if an additional motion vector of a motion vector resolution not included in a selected motion vector resolution combination is estimated, one predicted image may be generated with respect to an image in units of encoding.

The subtracter 120 generates a residual image by subtracting a predicted image from a current image. Herein, the residual image is an image generated by subtracting a predicted image from an input image to be currently encoded, and means an image including a residual signal corresponding to the difference between a pixel of an input image and a pixel of a predicted image. In addition, since predicted images generated by the predictor 110 are generated as many as the number of motion vector resolution combinations, residual images generated by the subtracter 120 may also be generated as many as the number of motion vector resolution combinations. If a predicted image is generated according to an additional predicted motion vector, a residual image of the predicted image may be generated.

The transformer/quantizer 130 transforms/quantizes a residual image. Specifically, the transformer/quantizer 130 transforms a residual signal of the residual image generated by the subtracter 120 into a frequency domain to generate a transformed residual image with a transform coefficient, and quantizes the transform coefficient of the transformed residual image to generate a transformed/quantized residual image. Herein, a technique to transform a spatial-domain image signal into a frequency-domain signal, such as Hadamard Transform or Discrete Cosine Transform Based Integer Transform, may be used as the transform method, and various quantization techniques such as Dead Zone Uniform Threshold Quantization (DZUTQ) and Quantization Weighted matrix may be used as the quantization method.

The encoder 140 generates encoded image data for each motion vector resolution combination by encoding a transformed/quantized residual image, calculates an encoding cost of the encoded image data for each motion vector resolution combination, selects a motion vector resolution combination by using the encoding cost of the encoded image data for each motion vector resolution combination, and outputs encoded image data encoded by using a motion vector determined according to a motion vector resolution of the motion vector resolution combination selected. An entropy encoding technology may be used as a technology of encoding a quantized transform coefficient by the encoder 140, although other unlimited encoding technologies may be used as the technology of encoding a quantized transform coefficient by the encoder 140. The encoder 140 will be described later in detail with reference to FIGS. 2 and 3.

The inverse quantizer/transformer 150 reconstructs a residual image by inverse-quantizing/transforming a transformed/quantized residual image. Specifically, the inverse quantizer/transformer 150 reconstructs a residual image with a transform coefficient by inverse-quantizing a transformed/quantized residual image received from the transformer/quantizer 130, and reconstructs a residual image with a residual signal by inverse-transforming the residual image with a transform coefficient. In this case, the inverse quantizer/transformer 150 may reconstruct the residual image by inversely performing the transform/quantization process of the transformer/quantizer 130. Further, instead of inverse quantizing/transforming all the transformed/quantized residual images received from the transformer/quantizer 130, the inverse quantizer/transformer 150 may reconstruct only the residual image corresponding to the motion vector resolution combination by inverse quantizing/transforming only the residual image generated by inverse-transforming/quantizing the predicted image generated by using the motion vector determined according to the motion vector resolution combination selected by the encoder 140.

The adder 160 reconstructs the input image by adding the residual image reconstructed by the inverse quantizer/transformer 150 and the predicted image generated by the predictor 110. The reference picture memory 170 stores a reference picture generated by accumulating the reconstructed input image in units of a picture. The stored reference picture may be used by the predictor 110 to predict a next input image or a next picture.

Although not illustrated in FIG. 1, the image encoding apparatus 100 may further include an intra predictor and a deblocking filter in the predictor 110. In this case, the subtracter 120 may generate a residual image by subtracting a predicted image generated by the intra predictor, from an input image, and the transformer/quantizer 130 and the inverse quantizer/transformer 150 may further perform operations for transform/quantization of the residual image and inverse quantization/transform of the transformed/quantized residual image. In addition, the encoder 140 may generate encoded image data by encoding the transformed/quantized residual image, and the encoded image data may be included in a bitstream. In addition, the deblocking filter deblocking-filters the reconstructed input image. Herein, the deblocking filtering is an operation of reducing a block distortion generated when an image is encoded in units of a block. The deblocking filter may be applied to a block boundary and a macroblock boundary, the deblocking filter may be applied to only a macroblock boundary, or the deblocking filter may not be used.

Figure 2:
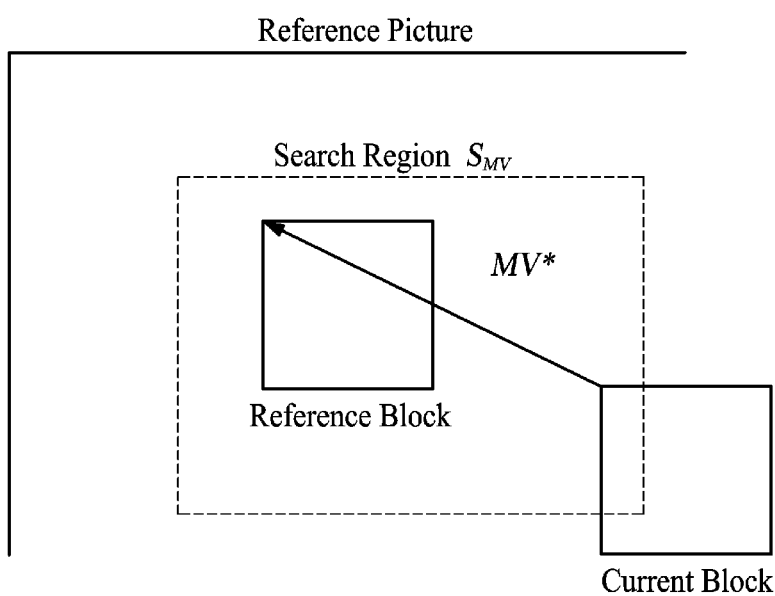
FIG. 2 is a diagram illustrating an example of determining a motion vector through motion estimation according to an embodiment of the present disclosure.

FIG. 2 is a diagram illustrating an example of determining a motion vector through motion estimation according to an embodiment of the present disclosure.

The predictor 110 estimates a motion of a current block by finding a reference block that is a block most similar to the current block among predetermined search regions in several reference pictures that can be used to determine a motion vector of the current block, and obtaining a reference picture index indicating a relevant reference picture and a motion vector indicating the reference block, as motion information. The method of determining a motion vector may be expressed as Equation 1 and Equation 2.

$$mcost(MV) = SAD(\text{org}, \text{ref}_{MV}) + \lambda \times \text{Rate}(MV, PMV, \text{ref\_idx}) \quad \text{Equation 1}$$

$$MV^* = \arg\min_{MV \in S_{MV}} mcost(MV) \quad \text{Equation 2}$$

In Equation 1, MV denotes a motion vector of a current block. A position of the motion vector may be present everywhere in several reference pictures. In Equation 1, org denotes an original current block, and $\text{ref}_{MV}$ denotes a reference block indicated by MV. $SAD(\text{org}, \text{ref}_{MV})$ denotes a function for calculating the sum of absolute values of pixel differences between two blocks org and $\text{ref}_{MV}$, $\lambda$ denotes a Lagrange multiplier, PMV denotes a predicted motion vector, ref_idx denotes a reference picture index that is an index for representing a reference picture, Rate(MV, PMV, ref_idx) denotes a function for calculating a difference value between MV and PMV and the number of bits required to encode ref_idx, and mcost(MV) denotes an encoding cost for encoding motion information corresponding to MV. In Equation 2, MV* denotes a motion vector of a current block finally determined, and $S_{MV}$ denotes a motion search region.

Thus, the predictor 110 may calculate an encoding cost for each MV that can be considered in a predetermined motion search region $S_{MV}$ of several reference pictures, by using Equation 1, find the MV with the lowest encoding cost by using Equation 2, and determine the same as a motion vector of a current block. Although it is illustrated in Equation 1 that the encoding cost is calculated by a rate-distortion (RD) cost, the encoding cost is not necessarily calculated by an RD cost and it may be calculated in various ways.

The calculation of an encoding cost required to encode a current block is influenced not only by a motion vector but also by a block mode of a current block. A method of determining a block mode may be expressed as Equation 3 and Equation 4.

$$rdcost(i) = \\ SSD(org, rec_i) + \lambda \times \text{Rate}(MV_i, PMV, \text{ref\_idx}, \text{coeff}_i)$$ Equation 3

$$i^* = \arg\min_{i \in S_{mode}} rdcost(i)$$ Equation 4

In Equation 3, org, $\lambda$, PMV, and ref_idx are the same as those in Equation 1, i denotes a block mode index for identification of an inter block mode, $S_{mode}$ denotes a set of inter block modes from a 16×16 pixel block to a 4×4 pixel block, $rec_i$ denotes a reconstructed block reconstructed by encoding/decoding a current block by using a block mode i, $SSD(org, rec_i)$ denotes a function of calculating the sum of square errors of pixels between org and $rec_i$, $coeff_i$ denotes a quantized transform coefficient generated by transforming/quantizing a residual block of the current block by using the block mode i, $\text{Rate}(MV_i, PMV, \text{ref\_idx}, \text{Coeff}_i)$ denotes a function for calculating a difference value between MV and PMV and the number of bits required to encode ref_idx and a quantized transform coefficient when the block mode i is used to encode a current block, and rdcost(i) denotes an encoding cost required to encode the current block by using the block mode i. In Equation 4, i* denotes an index indicating a block mode of the current block finally determined.

Thus, the predictor 110 may calculate encoding costs for several inter block modes by using Equation 3, find an index i* indicating a block mode with the lowest encoding cost by using Equation 4, and determine the same as a final block mode of the current block. Although it is illustrated in Equation 3 that the encoding cost is calculated by an RD cost, the encoding cost is not necessarily calculated by an RD cost and it may be calculated in various ways.

Although it is illustrated in FIG. 2 that the predictor 110 calculates an encoding cost, the present disclosure is not necessarily limited thereto. For example, the encoder 140 may calculate an encoding cost and provide the calculated encoding cost to the predictor 110, so that the predictor 110 may determine a motion vector.

The motion vector obtained through Equation 2 is prediction-encoded, and the predictor 110 or the encoder 140 encodes a differential motion vector that is a difference value between a motion vector and a predicted motion vector thereof, as expressed in Equation 5.

$$MVD = MV^* - PMV$$ Equation 5

A typical video compression standard such as H.264/AVC obtains a motion vector by performing motion estimation with a resolution of integer pixel, ½ pixel or ¼ pixel, and encodes a differential motion vector of the motion vector by using a code table where a bit string is allocated for every multiple of ¼ pixel as illustrated in Table 1.

TABLE 1

| Differential Motion Vector | Code Number | Bit String |
|---|---|---|
| 0 | 0 | 1 |
| ¼ | 1 | 010 |
| −¼ | 2 | 011 |
| 2/4 | 3 | 00100 |
| ... | ... | ... |
| 2 | 15 | 000010000 |
| ... | ... | ... |
| 3 | 23 | 000011000 |
| ... | ... | ... |

As can be seen from Table 1, a typical compression standard also uses long codewords to encode a small motion vector in order to encode all of the motion vectors of various resolutions. Consequently, the size of encoded motion vector data generated by encoding a motion vector increases, thus degrading compressing efficiency. For example, referring to Table 1, if a differential motion vector is (3,2), a bit string '00011000' with a code number '23' is used to encode '3' and a bit string '0001000' with a code number '15' is used to encode '2'. Long codewords are used to small motion vectors, because a codeword for encoding a motion vector of a ½ pixel resolution and a ¼ pixel resolution and a codeword for encoding a motion vector of an integer pixel resolution are used together.

In order to solve this problem, an embodiment of the present disclosure prepares a plurality of motion vector resolution combinations including one or more motion vectors, performs motion estimation, motion compensation, residual image encoding, and motion vector encoding with a motion vector resolution for each motion vector resolution combination, calculates relevant encoding costs, selects a motion vector resolution combination with the lowest encoding cost, and generates a bitstream including encoded image data and encoded motion vector data encoded based on a motion vector determined according to a motion vector resolution of the selected motion vector resolution combination.

Figure 3:
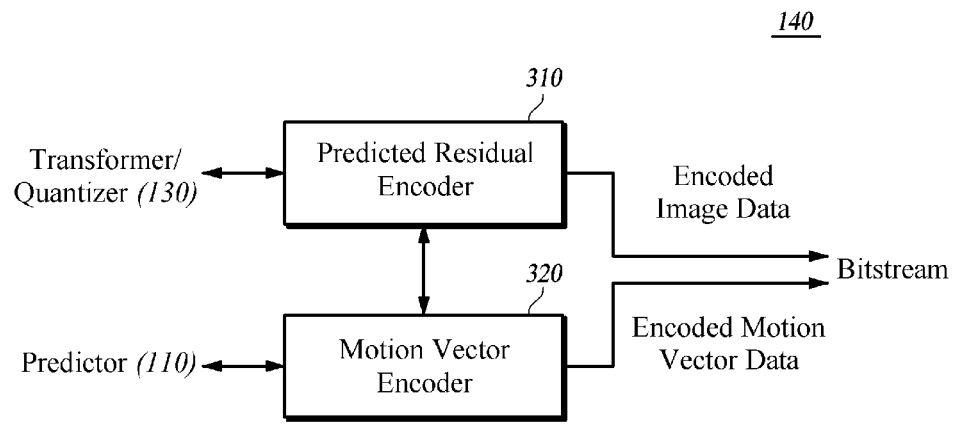
FIG. 3 is a block diagram illustrating a schematic configuration of an encoder according to an embodiment of the present disclosure.

FIG. 3 is a block diagram illustrating a schematic configuration of an encoder according to an embodiment of the present disclosure.

According to an embodiment of the present disclosure, the encoder 140 may include a predicted residual encoder 310 and a motion vector encoder 320.

The predicted residual encoder 310 generates encoded image data for each motion vector resolution combination by encoding a transformed/quantized residual image. Specifically, the predicted residual encoder 310 encodes a residual image transformed/quantized by the transformer/quantizer 130. The predicted residual encoder 310 generates encoded image data for each motion vector resolution combination by encoding a quantized/transformed residual image for each motion vector resolution combination.

The motion vector encoder 320 calculates an encoding cost of encoded image data for each motion vector resolution combination, selects a motion vector resolution combination by using the encoding cost of the encoded image data for each motion vector resolution combination, and outputs encoded motion vector data generated by encoding the motion vector determined according the motion vector resolution of the motion vector resolution combination selected. Specifically, the motion vector encoder 320 calculates an encoding cost required to encode each encoded image data by using various information received from the predictor 110 and the predicted residual encoder 310 in the process of encoding the encoded image data of each motion vector resolution combination generated by the predicted residual encoder 310, selects one motion vector resolution combination among several motion vector resolution combinations by using the same, and outputs encoded motion vector data generated by encoding the motion vector determined according to the motion vector resolution combination selected. In this case, when calculating an encoding cost for each motion vector resolution combination, the motion vector encoder 320 previously encodes a motion vector determined for each motion vector resolution combination and generates encoded motion vector data for each motion vector resolution combination. Therefore, the motion vector encoder 320 may output previously-generated encoded motion vector data without generating additional encoded motion vector data again after selecting a motion vector resolution combination. The motion vector encoder 320 will be described in detail with reference to FIG. 4.

Figure 4:
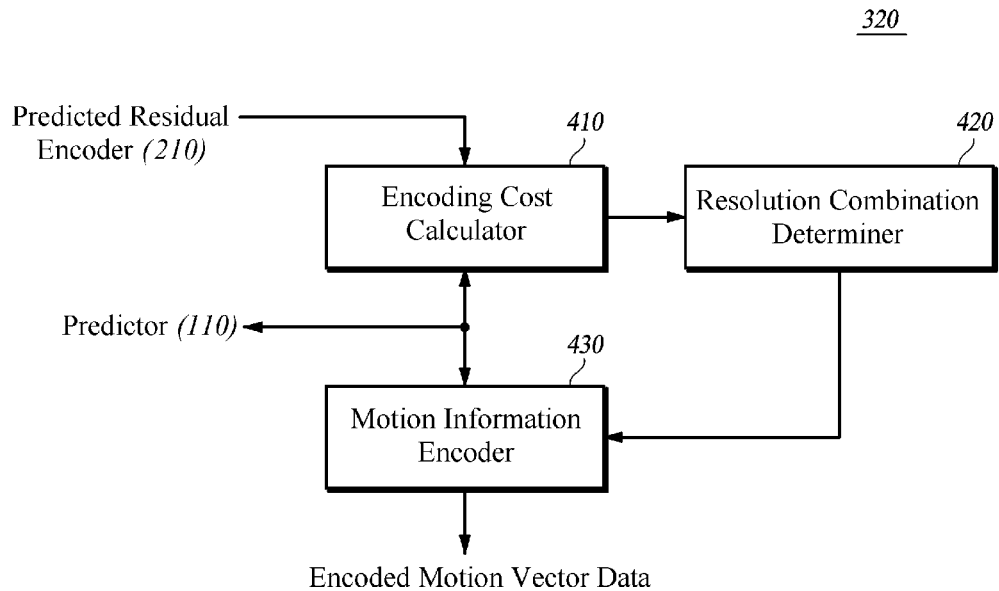
FIG. 4 is a block diagram illustrating a schematic configuration of a motion vector encoding apparatus according to an embodiment of the present disclosure.

FIG. 4 is a block diagram illustrating a schematic configuration of a motion vector encoding apparatus according to an embodiment of the present disclosure.

A motion vector encoding apparatus according to an embodiment of the present disclosure may be implemented by the motion vector encoder 320 in the encoder 140 described with reference to FIG. 3. Hereinafter, for the convenience of description, the motion vector encoding apparatus according to an embodiment of the present disclosure will be referred to as a motion vector encoder 320.

The motion vector encoder 320 may include an encoding cost calculator 410, a motion information encoder 430, and a resolution combination determiner 420.

The encoding cost calculator 410 calculates an encoding cost according to a motion vector resolution of each motion vector resolution combination with respect to each of a plurality of motion vector resolution combinations including one or more motion vector resolutions. Specifically, the encoding cost calculator 410 calculates a cost required to encode a residual image corresponding to a difference between an input image and a predicted image generated by using motion information including a reference picture index and a motion vector determined according to a motion vector resolution with respect to each motion vector resolution combination.

Herein, the motion vector resolution may include one or more of an integer pixel resolution, a ½ pixel resolution, a ¼ pixel resolution, and a ⅛ pixel resolution. However, the present disclosure is not limited thereto, and the motion vector resolution may include a smaller pixel resolution. In addition, the motion vector resolution combination means a group including one or more motion vector resolutions available for motion estimation. The available motion vector resolution means a motion vector resolution that is prearranged and set to be used as a motion vector resolution in the image encoding apparatus 100 and an image decoding apparatus to be described later, or the motion vector encoding apparatus and a motion vector decoding apparatus to be described later. For example, if the image encoding apparatus and the image decoding apparatus are prearranged to use only an integer pixel motion vector resolution and a ½ pixel motion vector resolution, available motion vector resolutions are an integer pixel motion vector resolution and a /12 pixel motion vector resolution, and if the image encoding apparatus and the image decoding apparatus are prearranged to use only an integer pixel motion vector resolution, a ½ pixel motion vector resolution, a ¼ pixel motion vector resolution, and a ⅛ pixel motion vector resolution, available motion vector resolutions are an integer pixel motion vector resolution, a ½ pixel motion vector resolution, a ¼ pixel motion vector resolution, and a ⅛ pixel motion vector resolution.

For example, if the available motion vector resolutions are an integer pixel motion vector resolution, a ½ pixel motion vector resolution, a ¼ pixel motion vector resolution, and a ⅛ pixel motion vector resolution, motion vector resolution combinations may include first to fifteenth motion vector resolution combinations as illustrated in Table 2. However, these types and combinations of motion vector resolutions are merely exemplary, and more motion vector resolution types or fewer motion vector resolution types may be used and more various motion vector resolution combinations may be used. For example, although four motion vector resolution types are used in the above example, ten motion vector resolution combinations corresponding thereto may be used. If only two motion vector resolution types are used, three or two motion vector resolution combinations may be used.

TABLE 2

| Resolution Combination Index | Motion Vector Resolution |
| --- | --- |
| 1 | 1 |
| 2 | ½ |
| 3 | ¼ |
| 4 | ⅛ |
| 5 | 1, ½ |
| 6 | 1, ¼ |
| 7 | 1, ⅛ |
| 8 | ½, ¼ |
| 9 | ½, ⅛ |
| 10 | ¼, ⅛ |
| 11 | 1, ½, ¼ |
| 12 | 1, ½, ⅛ |
| 13 | 1, ¼, ⅛ |
| 14 | ½, ¼, ⅛ |
| 15 | 1, ½, ¼, ⅛ |

Thus, in the above example, the encoding cost calculator 410 calculates an encoding cost required to prediction-encode an input image by using a motion vector determined by estimating a motion with an integer pixel resolution included in the first motion vector resolution combination, as an encoding cost of the first combination, and calculates an encoding cost required to prediction-encode an input image by using a motion vector determined by estimating a motion with a ½ pixel resolution included in the second motion vector resolution combination, as an encoding cost of the second combination. Likewise, the encoding cost calculator 410 calculates encoding costs of the third to fourteenth combinations. The encoding cost calculator 410 calculates an encoding cost required to prediction-encode an input image by using a motion vector determined by estimating a motion with a ½, ¼ or ⅛ pixel resolution included in the fifteenth motion vector resolution combination, as an encoding cost of the fifteenth combination.

In addition, the encoding cost calculator 410 may determine one or more of a block mode and a motion vector for each block according to a motion vector resolution for each motion vector resolution combination, and calculate an encoding cost by using one or more of the determined motion vector and the determined block mode.

In addition, the encoding cost calculator 410 may calculate an encoding cost by encoding a motion vector by using a different code table according to a motion vector resolution for each motion vector resolution combination. Specifically, the encoding cost calculator 410 may prestore a different code table for each motion vector resolution combination, and encode a motion vector of a motion vector resolution for each motion vector resolution combination by using the code table. Herein, the different code table for each motion vector resolution combination means a code table for performing encoding by considering only a motion vector of a motion vector resolution in each motion vector resolution combination.

Thus, in the above example, a code table for the first motion vector resolution combination is a code table for performing encoding by considering only a motion vector of an integer pixel resolution as illustrated in Table 3. In addition, a code table for the twelfth motion vector resolution combination is a code table for performing encoding by considering only a motion vector of an integer, ½ or ⅛ pixel resolution as illustrated in Table 4.

TABLE 3

| Differential Motion Vector | Code Number | Bit String |
|---|---|---|
| 0 | 0 | 1 |
| 1 | 1 | 010 |
| −1 | 2 | 011 |
| 2 | 3 | 00100 |
| −2 | 4 | 00101 |
| 3 | 5 | 00110 |
| −3 | 6 | 00111 |
| 4 | 7 | 0001000 |
| ... | ... | ... |

TABLE 4

| Differential Motion Vector | Code Number | Bit String |
|---|---|---|
| 0 | 0 | 1 |
| ⅛ | 1 | 010 |
| −⅛ | 2 | 011 |
| ⅜ | 3 | 00100 |
| −⅜ | 4 | 00101 |
| ½ | 5 | 00110 |
| −½ | 6 | 00111 |
| ⅝ | 7 | 0001000 |
| ... | ... | ... |

Thus, in an embodiment of the present disclosure, code tables for encoding motion vectors determined for the motion vector resolution combinations are configured differently according to the respective motion vector resolution combinations, a code table used for motion vector encoding is determined and used adaptively according to a selected motion vector resolution combination. Accordingly, the motion vector can be encoded efficiently, and compression efficiency can be improved.

The resolution combination determiner 420 selects a motion vector resolution combination by using an encoding cost calculated for each motion vector resolution combination. Specifically, the resolution combination determiner 420 compares the encoding costs for the respective motion vector resolution combinations calculated by the encoding cost calculator 410, and selects a motion vector resolution combination with the lowest encoding cost. Herein, the resolution combination determiner 420 may select a motion vector resolution combination for each encoding unit including one or more of block, slice, picture and picture group.

In this case, the resolution combination determiner 420 may select a motion vector resolution combination as expressed in Equation 6.

$$k^* = \arg\min_{1 \leq k \leq 15} RDcost(k) \qquad \text{Equation 6}$$

In Equation 6, k denotes a resolution combination index for identification of a motion vector resolution combination, RDcost(k) denotes an RD cost as an encoding cost generated when all the blocks in the encoding unit are encoded by using a motion vector resolution combination corresponding to the resolution combination index k, and k* denotes a resolution combination index for identification of a motion vector resolution combination selected by the resolution combination determiner 420. When the resolution combination index k* for identification of the motion vector resolution combination selected by the resolution combination determiner 420 is encoded by the motion information encoder 430 and generated as resolution combination index data, it is included in a bitstream.

The motion information encoder 430 outputs encoded motion vector data generated by encoding a motion vector determined according to a selected motion vector resolution combination. Specifically, when a motion vector resolution combination is selected by the resolution combination determiner 420, the motion information encoder 430 outputs encoded motion vector data generated by encoding a motion vector determined according to a motion vector resolution of the motion vector resolution combination selected by the resolution combination determiner 420 among the encoded motion vector data encoded and generated in the encoding cost calculation process of the encoding cost calculator 410. In this case, since the encoding cost and the motion vector resolution combination are calculated and selected in each encoding unit such as a slice, the encoded motion vector data outputted from the motion information encoder 430 may also be encoded motion vector data generated in each block in each encoding unit such as a slice. In addition, the encoded motion vector data may further include a reference picture index in addition to a motion vector.

In this case, the motion information encoder 430 may output resolution combination index data by encoding a resolution combination index indicating a selected motion vector resolution combination. The resolution combination index data is further included in a bitstream, and is used by the motion vector decoding apparatus and the image decoding apparatus to identify a motion vector resolution combination.

In an embodiment of the present disclosure, in order to consider the case where, among available motion vector resolutions, a motion vector resolution not included in a motion vector resolution combination selected in a predetermined encoding unit generates the optimal encoding efficiency at a partial region or block in the predetermined encoding unit, a motion is estimated by considering a motion vector resolution not included in a motion vector resolution combination whenever each region or block is encoded. Accordingly, a motion vector of a more efficient motion vector resolution is determined. To this end, template matching may be used in an embodiment of the present disclosure.

Hereinafter, a process of performing motion estimation considering a motion vector resolution not included in a selected motion vector resolution combination among available motion vector resolutions, by using a template matching will be described with reference to FIGS. 5 and 6.

Figure 5:
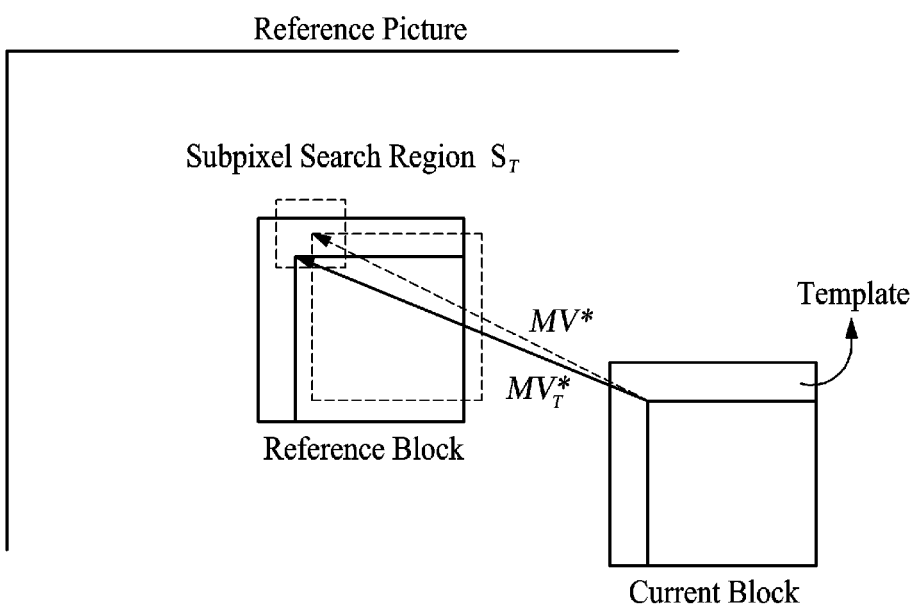
FIG. 5 is a diagram illustrating an example of a process of estimating a motion vector of a motion vector resolution in units of a small pixel by template matching according to an embodiment of the present disclosure.

FIG. 5 is a diagram illustrating an example of a process of estimating a motion vector of a motion vector resolution that is not included in a motion vector resolution combination, by template matching according to an embodiment of the present disclosure.

As illustrated in FIG. 5, the predictor 110 finds a reference block having an adjacent pixel most similar to an adjacent pixel of a current block in a reference picture with a motion vector resolution not included in a motion vector resolution combination selected by the encoder 140 among available motion vector resolutions, and obtains a motion vector indicating the reference block. In this case, a search region for estimating a motion by template matching with a motion vector resolution not included in a motion vector resolution combination may be restricted to an adjacent region of a motion vector determined according to a selected motion vector resolution combination. Herein, the adjacent region of a motion vector may be a region that is spaced apart from a pixel indicated by the motion vector, by a predetermined number of pixels differently or identically in up/down/left/right directions.

Figure 6:
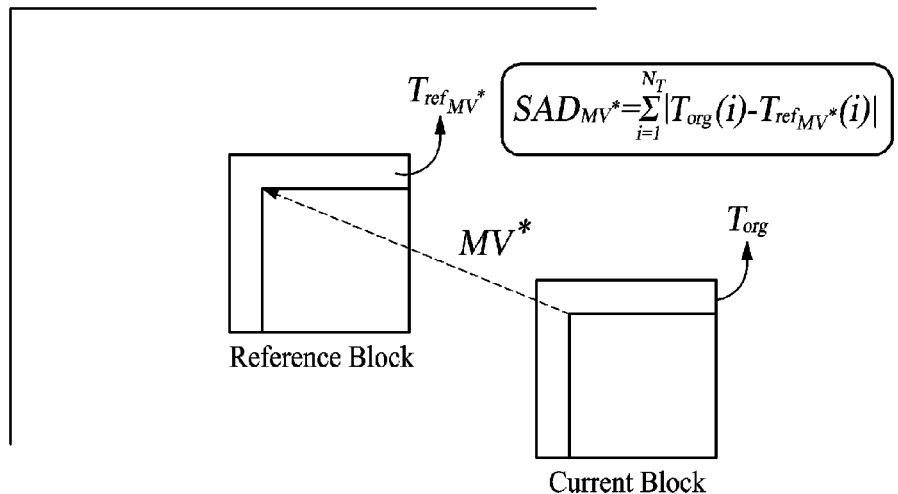
FIG. 6 is a diagram illustrating an example of a process of selecting a motion vector according to an embodiment of the present disclosure.
Figure 6:
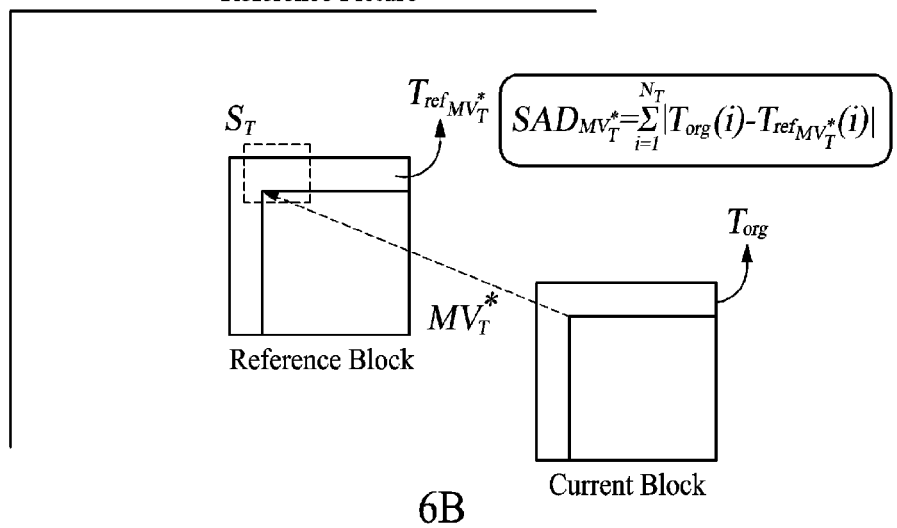

FIG. 6 is a diagram illustrating an example of a process of selecting a motion vector according to an embodiment of the present disclosure.

FIG. 6A illustrates a process of calculating an encoding cost for a motion vector determined according to a motion vector resolution combination selected by the encoder 140, and FIG. 6B illustrates a process of calculating an encoding cost for a motion vector determined by template matching with a motion vector resolution not included in a motion vector resolution combination selected by the encoder 140. The encoding costs calculated as illustrated in FIGS. 6A and 6B may be calculated by using Equations 7 and 8.

$$SAD_{MV^*} = \sum_{i=1}^{N_T} |T_{org}(i) - T_{ref_{MV^*}}(i)| \quad \text{Equation 7}$$

$$SAD_{MV^*_T} = \sum_{i=1}^{N_T} |T_{org}(i) - T_{ref_{MV^*_T}}(i)| \quad \text{Equation 8}$$

In Equations 7 and 8, $T_{org}(i)$ denotes a current template representing an adjacent pixel of a current block, $T_{ref_{MV^*}}(i)$ denotes a reference template representing an adjacent pixel of a reference block indicated by a motion vector MV* determined according to a motion vector resolution selected by the resolution combination determiner 420, $N_T$ denotes the number of pixels included in the current template and the reference template, and $$T_{ref_{MV^*_T}}(i)$$

denotes a reference template representing an adjacent pixel of the reference block indicated by a motion vector $MV^*_T$ determined by template matching with a motion vector resolution not included in the motion vector resolution combination selected by the resolution combination determiner 420. In Equations 8 and 9, a distortion cost is exemplified as an encoding cost; however, the encoding cost is not limited thereto and may be calculated in various ways.

Since a motion vector having the smallest SAD among the SADs calculated by using Equations 7 and 8 provides higher encoding efficiency, the predictor 110 outputs a predicted block by compensating a motion of a block by using the relevant motion vector. In this case, the predictor 110 may select a motion vector for each block in an encoding unit. Thus, the predictor 110 may output a predicted block motion-compensated by using an estimated motion vector only in the case where a motion vector selected for each block is a motion vector additionally estimated by template matching, and does not additionally generate a predicted block in the case where the motion vector determined according to the selected motion vector resolution combination is selected.

As described with reference to FIGS. 5 and 6, with respect to a motion vector estimated with a motion vector resolution not included in a selected motion vector resolution combination among available motion vector resolutions, additional information for additionally encoding or identifying the same or information indicating whether encoded image data encoded by using a motion vector is included in a bitstream may not be encoded. The reason for this is that the image decoding apparatus may perform the processes of FIGS. 5 and 6 in the same manner as the image encoding apparatus 100.

Figure 7:
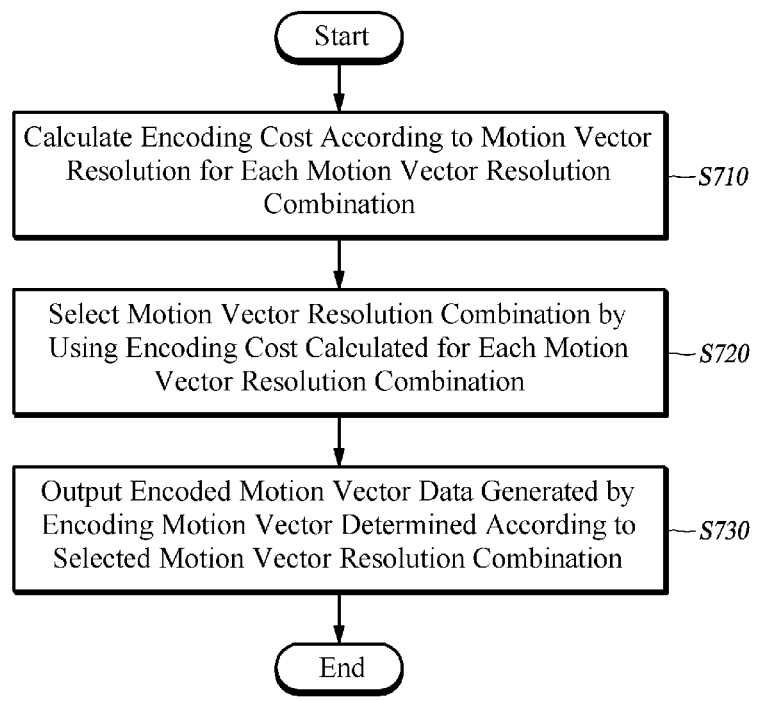
FIG. 7 is a flow diagram illustrating a motion vector encoding method according to an embodiment of the present disclosure.

FIG. 7 is a flow diagram illustrating a motion vector encoding method according to an embodiment of the present disclosure.

In a motion vector encoding method according to an embodiment of the present disclosure, the motion vector encoder 320 calculates an encoding cost according to a motion vector resolution for each motion vector resolution combination including one or more motion vector resolutions (S710), selects a motion vector resolution combination by using the encoding cost calculated for each motion vector resolution combination (S720), and outputs encoded motion vector data generated by encoding a motion vector determined according to the motion vector resolution combination selected (S730).

Herein, the motion vector resolution may include one or more of an integer pixel resolution, a ½ pixel resolution, a ¼ pixel resolution, and a ⅛ pixel resolution.

In addition, the motion vector encoder 320 may output additional resolution combination index data by encoding a resolution combination index indicating a selected motion vector resolution combination.

In step S720, the motion vector encoder 320 may select a motion vector resolution combination for each encoding unit including one or more of block, slice, picture and picture group, and may select a motion vector resolution combination having the lowest encoding cost among the encoding costs calculated for the respective motion vector resolution combinations.

Figure 8:
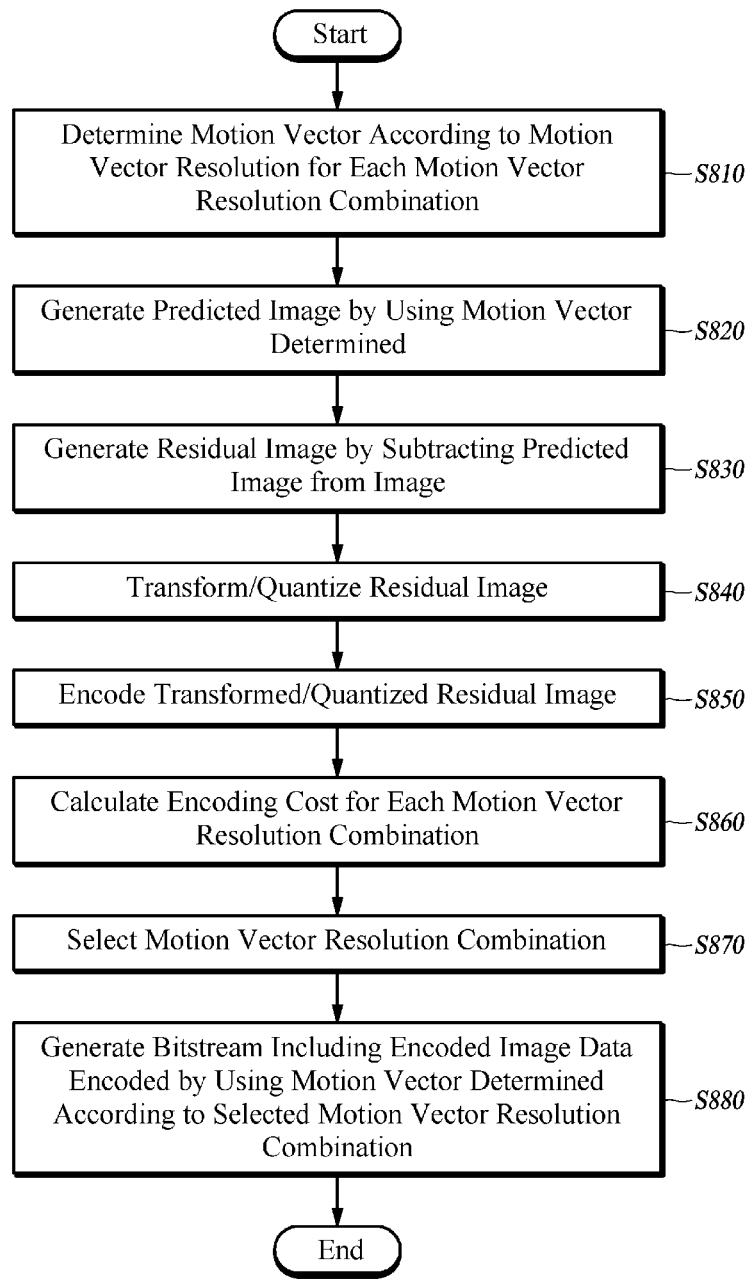
FIG. 8 is a flow diagram illustrating an image encoding method according to an embodiment of the present disclosure.

FIG. 8 is a flow diagram illustrating an image encoding method according to an embodiment of the present disclosure.

In an image encoding method according to an embodiment of the present disclosure, the image encoding apparatus 100 determines a motion vector of an image according to a motion vector resolution for each motion vector resolution combination including one or more motion vector resolutions (S810), generates a predicted image of the image by using the motion vector determined (S820), generates a residual image by subtracting the predicted image from the image (S830), transforms/quantizes the residual image (S840), generates encoded image data for each motion vector resolution combination by encoding the transformed/quantized residual image (S850), calculates an encoding cost of the encoded image data for each motion vector resolution combination (S860), selects a motion vector resolution combination by using the encoding cost of the encoded image data for each motion vector resolution combination (S870), and outputs a bitstream including encoded image data encoded by using a motion vector determined according to a motion vector resolution of the motion vector resolution combination selected (S880).

In step S880, the image encoding apparatus 100 may estimate a motion vector of a motion vector resolution not included in a selected motion vector resolution combination among available motion vector resolutions, and generate a bitstream including encoded image data by encoding the image by using the estimated motion vector of the motion vector resolution. In this case, the image encoding apparatus 100 may estimate a motion vector of a motion vector resolution not included in a selected motion vector resolution combination by using template matching, and generate a bitstream including encoded image data encoded by using a motion vector with a lower encoding cost, among the encoding cost required to prediction-encode the image according to the motion vector determined according to the selected motion vector resolution combination and the encoding cost required to prediction-encode the image according to the motion vector of the motion vector resolution not included in the selected motion vector resolution combination.

Figure 9:
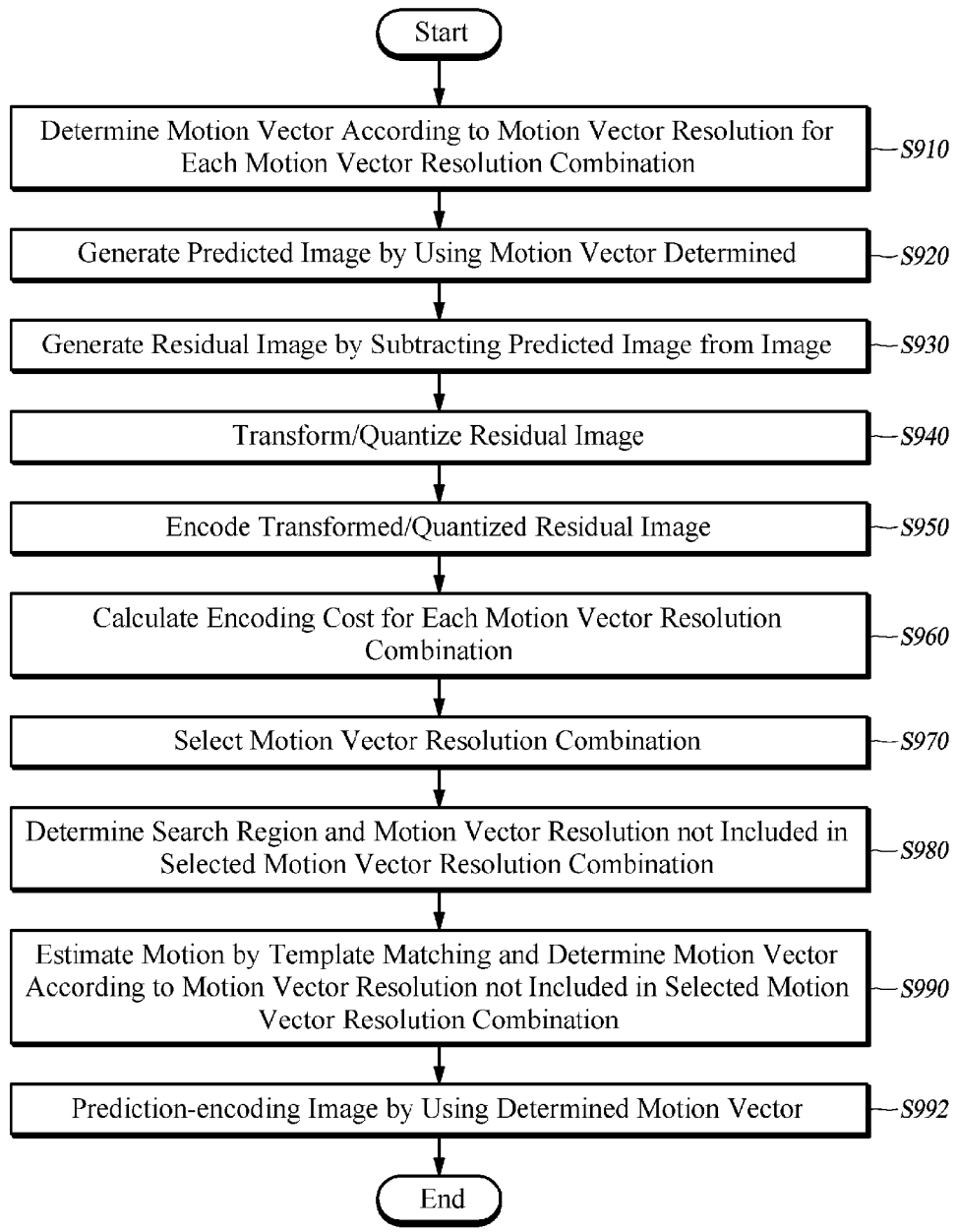
FIG. 9 is a flow diagram illustrating another example of an image encoding method according to an embodiment of the present disclosure.

FIG. 9 is a flow diagram illustrating another example of an image encoding method according to an embodiment of the present disclosure.

Since steps S910 to S970 are identical to or similar to steps S810 to S870, a detailed description thereof will be omitted.

The image encoding apparatus 100 determines a search region for motion estimation based on the motion vector determined according to the selected motion vector resolution combination and the motion vector resolution not included in the selected motion vector resolution combination in step S970 among available motion vector resolutions (S980). For example, if a motion vector resolution combination including integer, ½ and ⅛ pixel motion vector resolutions is selected in step S870, the motion vector resolution not included in the motion vector resolution combination selected among available motion vector resolutions is a ¼ pixel motion vector resolution. In this case, the image encoding apparatus 100 sets a search region for additional motion estimation to be restricted to an adjacent region of the motion vector determined according to the selected motion vector resolution combination.

In addition, the image encoding apparatus 100 determines a motion vector of a motion vector resolution not included in the motion vector resolution combination, by performing motion estimation in the search region determined in step S980 with a motion vector resolution not included in the motion vector resolution combination by using template matching (S990). Specifically, as described with reference to FIG. 5, the image encoding apparatus 100 determines a motion vector or a ¼ pixel motion vector resolution by additionally estimating a motion of each block in a slice with a ¼ pixel motion vector resolution by using template matching. In this case, as described with reference to FIG. 6, the image encoding apparatus 100 may output a bitstream including encoded image data encoded by using a motion vector having a higher encoding efficiency among the motion vector determined according to the selected motion vector resolution combination in step S970 and the motion vector determined by performing motion estimation with a motion vector resolution not included in the motion vector resolution combination in step S990 by using template matching.

The respective steps of FIGS. 7 to 9 are not necessarily performed, and they may be omitted or added selectively according to embodiments, whenever necessary. In addition, the order of the respective steps is not limited to that illustrated. The order of some or all of the respective steps may be changed, and some or all of the respective steps may be performed in parallel.

Figure 10:
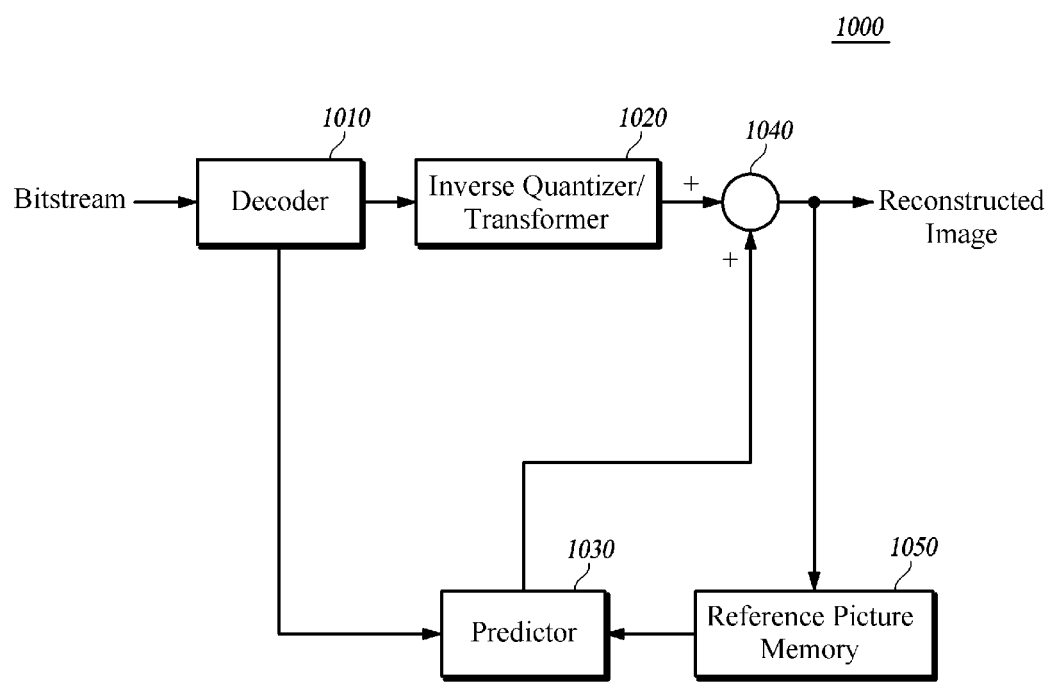
FIG. 10 is a block diagram illustrating a schematic configuration of an image decoding apparatus according to an embodiment of the present disclosure.

FIG. 10 is a block diagram illustrating a schematic configuration of an image decoding apparatus according to an embodiment of the present disclosure.

An image decoding apparatus 1000 according to an embodiment of the present disclosure may include a decoder 1010, an inverse quantizer/transformer 1020, a predictor 1030, an adder 1040, and a reference picture memory 1050.

The decoder 1010 reconstructs a motion vector by decoding encoded motion vector data extracted from a bitstream according to a motion vector resolution reconstructed by decoding resolution combination index data extracted from the bitstream, and reconstructs a transformed/quantized residual image by decoding encoded image data extracted from the bitstream. Specifically, the decoder 1010 reconstructs a resolution combination index, a motion vector, and a transformed/quantized residual image by decoding resolution combination index data, encoded motion vector data, and encoded image data extracted from the bitstream. In this case, the decoder 1010 decodes encoded motion vector data by using a code table identified by a motion vector resolution combination represented by a reconstructed resolution combination index. The decoder 1010 may perform decoding by using encoding technology such as entropy encoding, and may perform decoding by inversely performing the encoding process of the encoder 140 described with reference to FIG. 1.

The inverse quantizer/transformer 1020 reconstructs a residual image by inverse-quantizing/transforming a transformed/quantized residual image. Specifically, the inverse quantizer/transformer 1020 reconstructs a residual image with a residual signal by inverse-quantizing/transforming a quantized transform coefficient of a transformed/quantized residual image received from the decoder 1010. In this case, the inverse quantizer/transformer 1020 may perform inverse quantization/transform by inversely performing the transform/quantization process of the transformer/quantizer 130 described with reference to FIG. 1. Herein, the reconstructed residual image is an image in a predetermined encoding unit including several residual blocks, and images of the encoding unit may be various images such as block, slice, picture, and picture group.

The predictor 1030 generates a predicted image of the image by using a reconstructed motion vector. Specifically, the predictor 1030 generates predicted blocks by compensating motions of blocks to be encoded by using the motion vector reconstructed by the decoder 1010, and the predicted blocks are collected in a predetermined encoding unit to constitute a predicted image.

In addition, the predictor 1030 may estimate a motion vector not with a motion vector reconstructed by the decoder 1010 but with a motion vector resolution not included in a motion vector resolution combination represented by a resolution combination index reconstructed by the decoder 1010 among available motion vector resolutions, and generate a predicted image by using a motion vector of a motion vector resolution not included in an estimated motion vector resolution combination. Herein, the predictor 1030 may generate a predicted image by using a motion vector having a lower encoding cost among the encoding cost calculated by using a motion vector reconstructed by the decoder 1010 and the encoding cost calculated by using a motion vector estimated with a motion vector resolution not included in a motion vector resolution combination. In this case, the predictor 1030 may estimate a motion vector of a motion vector resolution not included in a motion vector resolution combination by using template matching.

The adder 1040 reconstructs the image by adding the residual image and the predicted image. Specifically, the adder 1040 reconstructs the image by adding the residual image reconstructed by the inverse quantizer/transformer 1020 and the predicted image generated by the predictor 1030.

The image reconstructed by the adder 1040 may be accumulated in units of a picture and outputted as a reconstructed image, and may be stored in the reference picture memory 1050 and used by the predictor 1030 to predict a next image.

Although not illustrated in FIG. 10, the image decoding apparatus 1000 according to an embodiment of the present disclosure may further include an intra predictor for intra prediction and a deblocking filter for deblocking-filtering a reconstructed current block.

Figure 11:
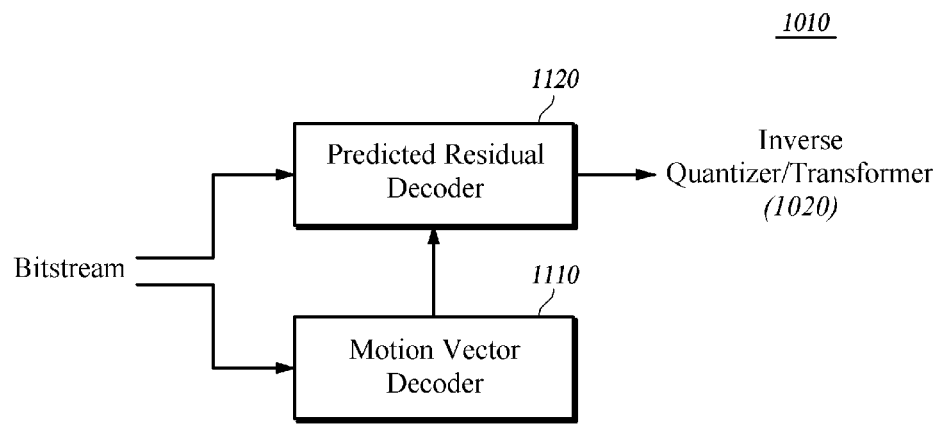
FIG. 11 is a block diagram illustrating a schematic configuration of a decoder according to an embodiment of the present disclosure.

FIG. 11 is a block diagram illustrating a schematic configuration of a decoder according to an embodiment of the present disclosure.

The decoder 1010 may include a motion vector decoder 1110 and a predicted residual decoder 1120.

The motion vector decoder 1110 reconstructs a motion vector by decoding encoded motion vector data extracted from a bitstream according to a motion vector resolution combination reconstructed by decoding resolution combination index data extracted from the bitstream. The motion vector decoder 1110 will be described later in detail with reference to FIG. 12.

The predicted residual decoder 1120 reconstructs a transformed/quantized residual image by decoding encoded image data extracted from the bitstream.

Figure 12:
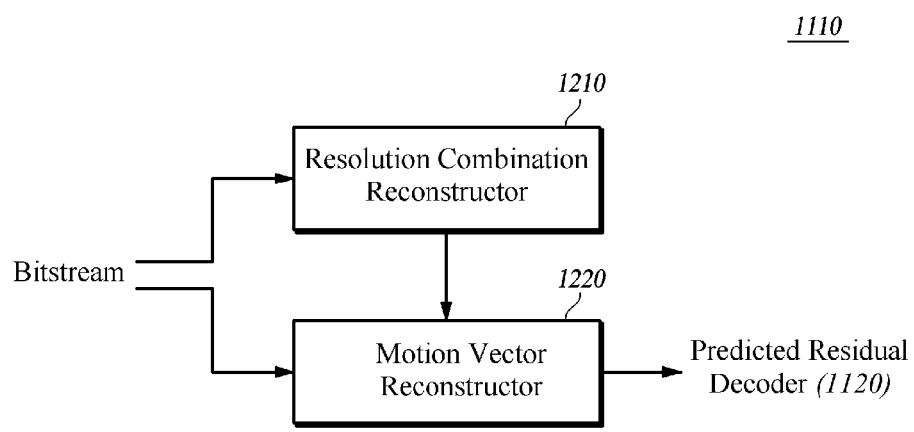
FIG. 12 is a block diagram illustrating a schematic configuration of a motion vector decoding apparatus according to an embodiment of the present disclosure.

FIG. 12 is a block diagram illustrating a schematic configuration of a motion vector decoding apparatus according to an embodiment of the present disclosure.

A motion vector decoding apparatus according to an embodiment of the present disclosure may be implemented by the motion vector decoder 1110 in the decoder 1010 described with reference to FIG. 11. Hereinafter, for the convenience of description, the motion vector decoding apparatus according to an embodiment of the present disclosure will be referred to as a motion vector decoder 1110.

The motion vector decoder 1110 may include a resolution combination reconstructor 1210 and a motion vector reconstructor 1220.

The resolution combination reconstructor 1210 reconstructs a motion vector resolution combination by decoding resolution combination index data extracted from a bitstream. Specifically, the resolution combination reconstructor 1210 reconstructs a resolution combination index by extracting and decoding resolution combination index data from a bitstream, and reconstructs a motion vector resolution combination represented by a reconstructed resolution combination index. In this case, the resolution combination reconstructor 1210 may extract resolution combination index data from a header of a predetermined encoding unit, such as a block header of the bitstream, a slice header, and a picture header. The reconstructed motion vector resolution combination may include information on a motion vector resolution combination for all the blocks in an image of a predetermined encoding unit. For example, if the motion vector resolution combination is the fifth motion vector resolution combination illustrated in Table 2, a motion vector of each block in a predetermined encoding unit has only an integer or ½ pixel motion vector resolution.

The motion vector reconstructor 1220 reconstructs a motion vector by decoding encoded motion vector data extracted from a bitstream according to a reconstructed motion vector resolution combination. Specifically, the motion vector reconstructor 1220 may reconstruct a motion vector of all the blocks in a predetermined encoding unit by extracting and decoding encoded motion vector data from a bitstream. The motion vector reconstructor 1220 may decode the encoded motion vector data by using a code table identified by the motion vector resolution combination reconstructed by the resolution combination reconstructor 1210. For example, if the reconstructed motion vector resolution combination is the first motion vector resolution combination, the motion vector may be reconstructed by decoding the encoded motion vector data by using the code table illustrated in Table 3. To this end, the motion vector reconstructor 1220 has and stores a different code table according to a motion vector resolution combination, and the code table is generated identically in arrangement with the motion vector encoder 430 or the image encoding apparatus 100.

Figure 13:
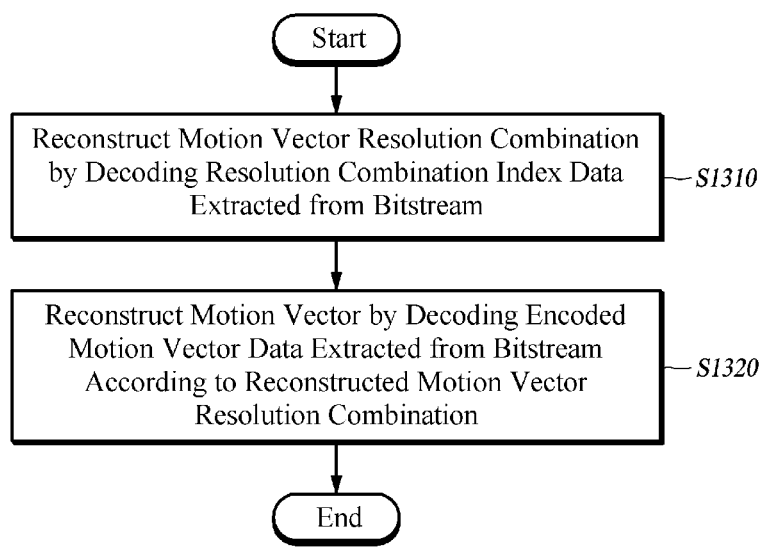
FIG. 13 is a flow diagram illustrating a motion vector decoding method according to an embodiment of the present disclosure.

FIG. 13 is a flow diagram illustrating a motion vector decoding method according to an embodiment of the present disclosure.

In a motion vector decoding method according to an embodiment of the present disclosure, the motion vector decoder 1110 reconstructs a motion vector resolution combination by decoding resolution combination index data extracted from a bitstream (S1310), and reconstructs a motion vector by decoding encoded motion vector data extracted from the bitstream according to the motion vector resolution combination reconstructed (S1320).

In step S1320, the motion vector decoder 1110 may decode the encoded motion vector data by using a different code table according to the motion vector resolution combination reconstructed in step S1310.

Figure 14:
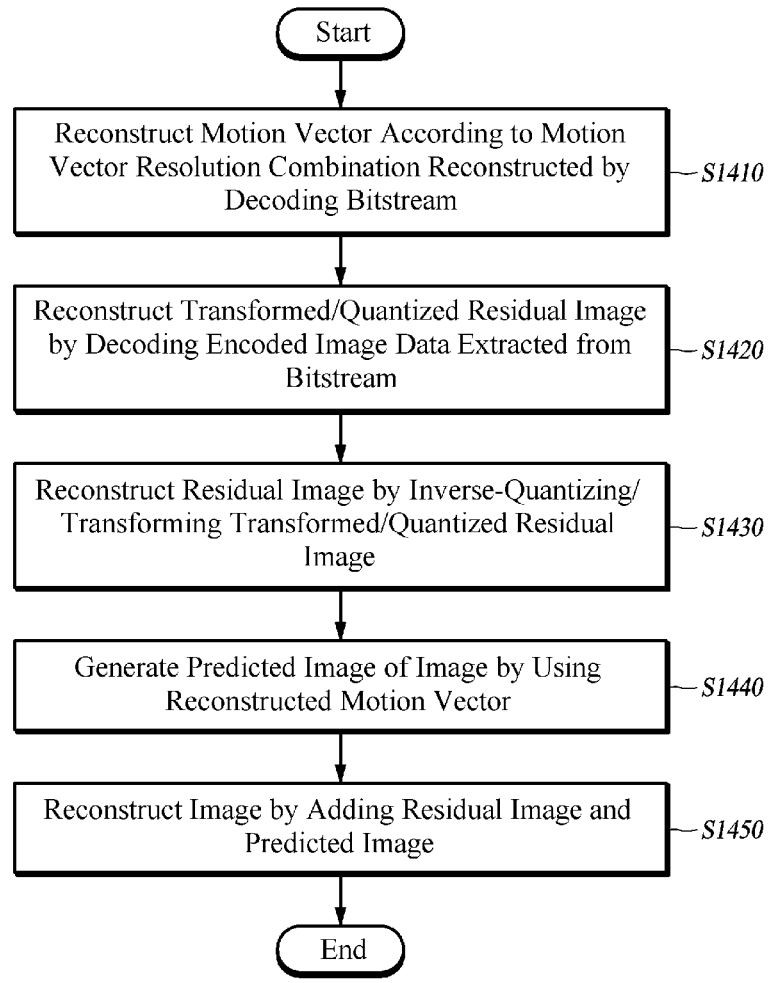
FIG. 14 is a flow diagram illustrating an image decoding method according to an embodiment of the present disclosure.

FIG. 14 is a flow diagram illustrating an image decoding method according to an embodiment of the present disclosure.

In an image decoding method according to an embodiment of the present disclosure, the image decoding apparatus 1000 reconstructs a motion vector by decoding encoded motion vector data extracted from a bitstream according to a motion vector resolution combination reconstructed by decoding resolution combination index data extracted from the bitstream (S1410), reconstructs a transformed/quantized residual image by decoding encoded image data extracted from the bitstream (S1420), reconstructs a residual image by inverse-quantizing/transforming the transformed/quantized residual image (S1430), generates a predicted image of an image by using the motion vector reconstructed (S1440), and reconstructs the image by adding the residual image and the predicted image (S1450).

In step S1440, the image decoding apparatus 1000 may generate a predicted image by using the motion vector reconstructed in step S1410, or may estimate a motion vector of a motion vector resolution not included in the motion vector resolution combination reconstructed in step 1410 and generate a predicted image by using a motion vector having a lower encoding cost among the encoding cost calculated by using the motion vector reconstructed in step S1410 and the encoding cost calculated by using the motion vector estimated with a motion vector resolution not included in a motion vector resolution combination. In this case, the image decoding apparatus 1000 may estimate a motion vector of a motion vector resolution not included in a motion vector resolution combination by using template matching.

The respective steps of FIGS. 13 to 14 are not necessarily performed, and some of the respective steps may be omitted or added selectively. In addition, the order of the respective steps is not limited to that illustrated. The order of some or all of the respective steps may be changed, and some or all of the respective steps may be performed in parallel.

As described above, according to an embodiment of the present disclosure, an efficient motion vector resolution combination is determined for blocks in an image of a predetermined encoding unit such as a slice, and a motion vector is encoded by using a code table suitable for the motion vector resolution combination. Accordingly, the number of bits required to encode a motion vector can be reduced, and the image compression efficiency can be improved.

In addition, according to an embodiment of the present disclosure, the image encoding apparatus 100 and the image decoding apparatus 1000 performs additional motion estimation with a motion vector resolution not included in a motion vector resolution combination among available motion vector resolutions through motion estimation technology such as template matching arranged therebetween, and encode an image by using motion vectors of various motion vector resolutions. Accordingly, the prediction accuracy can be increased, and the generation of a residual signal can be suppressed. In addition, the image compression efficiency can be further improved because it is not necessary to additionally encode a motion vector of a motion vector resolution determined through additional motion estimation.

In addition, when a motion vector resolution combination is selected adaptively and a motion vector is determined and encoded based on the motion vector resolution combination, a motion vector is reconstructed by reconstructing a motion vector resolution combination adaptively based on a bitstream. Accordingly, the image reconstruction efficiency can be improved.

Although it has been described above that a motion vector encoding apparatus and a motion vector decoding apparatus according to an embodiment of the present disclosure are implemented in separate apparatuses, the motion vector encoding apparatus and the motion vector decoding apparatus may be implemented in an image encoding/decoding apparatus. The image encoding/decoding apparatus may encode an image signal and transmit the result to another image processing apparatus, and may also receive a bitstream from another image processing apparatus and reconstruct/reproduce an image signal.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is applicable in the video compression field of video encoding/decoding and motion vector encoding/decoding therefore, and is highly useful for improving compression efficiency by selecting an efficient motion vector resolution combination adaptively and determining and encoding a motion vector based on the motion vector resolution combination, and for improving image reconstruction efficiency by reconstructing a motion vector by reconstructing a motion vector resolution combination adaptively based on a bitstream, in the case of selecting a motion vector resolution combination adaptively and determining and encoding a motion vector based on the motion vector resolution combination.

The invention claimed is:

1. An apparatus for encoding a motion vector of a current block, the apparatus comprising:
a resolution combination determiner configured to select a set of motion vector resolution candidates, to be applied to an image area in which the current block is located, from among a plurality of sets of motion vector resolution candidates, each set of the plurality of sets including one or more motion vector resolution candidates, wherein at least one of the plurality of sets of motion vector resolution candidates includes a plurality of motion vector resolution candidates; and
a motion information encoder configured to encode, into a bitstream, motion vector data determined for the motion vector of the current block according to a code table corresponding to the selected set of motion vector resolution candidates,
wherein each motion vector resolution is a resolution of each motion vector,
wherein the code table is selected from a plurality of code tables and each of the plurality of code tables includes a plurality of codewords corresponding to a plurality of motion vectors, and
wherein the plurality of motion vectors included in each of the plurality of code tables corresponds to each of the plurality of sets of motion vector resolution candidates further comprising an encoding cost calculator configured to calculate an encoding cost of the current block according to the one or more motion vector resolutions included in each set of the plurality of sets of motion vector resolution candidates, wherein the resolution combination determiner is configured to select the set of motion vector resolution candidates having the lowest encoding cost among the encoding costs calculated for the plurality of sets of the motion vector resolution candidates.

2. The apparatus of claim 1, wherein the motion information encoder is further configured to encode resolution combination index data identifying the selected set of motion vector resolution candidates from among the plurality of sets of motion vector resolution candidates.

3. The apparatus of claim 1, wherein the image area is one of a block, a slice, a picture, and a picture group.

4. The apparatus of claim 1, wherein the one or more motion vector resolutions of each set of the plurality of sets of motion vector resolution candidates include one or more of an integer pixel resolution, a ½ pixel resolution, a ¼ pixel resolution, and a ⅛ pixel resolution.

5. An apparatus for encoding a current block, the apparatus comprising:
   a predictor configured to
      determine a motion vector of the current block according to a motion vector resolution, and
      generate a predicted image of the current block by using the motion vector of the current block;
   a subtracter configured to generate a residual image by subtracting the predicted image from the current block;
   a transformer/quantizer configured to transform and quantize the residual image; and
   an encoder configured to
      generate encoded image data by encoding the transformed and quantized residual image,
      select a set of motion vector resolution candidates, to be applied to an image area in which the current block is located, from among a plurality of sets of motion vector resolution candidates, each set of the plurality of sets including one or more motion vector resolution candidates, wherein at least one of the plurality of sets of motion vector resolution candidates includes a plurality of motion vector resolution candidates, and
      encode, into a bitstream, motion vector data determined for the motion vector of the current block according to a code table corresponding to the selected set of motion vector resolution candidates,
   wherein each motion vector resolution is a resolution of each motion vector,
   wherein the code table is selected from a plurality of code tables and each of the plurality of code tables includes a plurality of codewords corresponding to a plurality of motion vectors, and
   wherein the plurality of motion vectors included in each of the plurality of code tables corresponds to each of the plurality of sets of motion vector resolution candidates wherein the encoder is further configured to calculate an encoding cost of the current block according to the one or more motion vector resolutions included in each set of the plurality of sets of motion vector resolution candidates, and select the set of motion vector resolution candidates having the lowest encoding cost among the encoding costs calculated for the plurality of sets of the motion vector resolution candidates.

6. The apparatus of claim 5, wherein the predictor is further configured to estimate the motion vector of the current block for a motion vector resolution excluded in the selected set of motion vector resolution candidates, and
   wherein the encoder is further configured to generate the bitstream including the encoded image data by prediction-encoding the current block by using the motion vector of the current block for the motion vector resolution excluded in the selected set of motion vector resolution candidates.

7. The apparatus of claim 6, wherein the predictor is configured to estimate the motion vector of the current block for the motion vector resolution excluded in the selected set of motion vector resolution candidates by using template matching for searching for a reference block having adjacent pixels similar to adjacent pixels of the current block in a reference picture.

8. A method for encoding a motion vector of a current block, the method comprising:
   selecting a set of motion vector resolution candidates, to be applied to an image area in which the current block is located, from among a plurality of sets of motion vector resolution candidates, each set of the plurality of sets including one or more motion vector resolution candidates, wherein at least one of the plurality of sets of motion vector resolution candidates includes a plurality of motion vector resolution candidates; and
   encoding, into a bitstream, motion vector data determined for the motion vector of the current block according to a code table corresponding to the selected set of motion vector resolution candidates,
   wherein each motion vector resolution is a resolution of each motion vector,
   wherein the code table is selected from a plurality of code tables and each of the plurality of code tables includes a plurality of codewords corresponding to a plurality of motion vectors, and
   wherein the plurality of motion vectors included in each of the plurality of code tables corresponds to each of the plurality of sets of motion vector resolution candidates further comprising an encoding cost calculator configured to calculate an encoding cost of the current block according to the one or more motion vector resolutions included in each set of the plurality of sets of motion vector resolution candidates, wherein the resolution combination determiner is configured to select the set of motion vector resolution candidates having the lowest encoding cost among the encoding costs calculated for the plurality of sets of the motion vector resolution candidates.

9. The method of claim 8, further comprising encoding resolution combination index data identifying the selected set of motion vector resolution candidates from among the plurality of sets of motion vector resolution candidates.

10. The method of claim 8, wherein the image area is one of a block, a slice, a picture, and a picture group.

11. The method of claim 8, wherein the one or more motion vector resolutions of each set of the plurality of sets of motion vector resolution candidates include one or more of an integer pixel resolution, a ½ pixel resolution, a ¼ pixel resolution, and a ⅛ pixel resolution.

12. A method for encoding a current block, the method comprising:
   determining a motion vector of the current block according to a motion vector resolution;
   generating a predicted image of the current block by using the motion vector of the current block;
   generating a residual image by subtracting the predicted image from the current block;
   transforming and quantizing the residual image;
   generating encoded image data by encoding the transformed and quantized residual image;
   selecting a set of motion vector resolution candidates, to be applied to an image area in which the current block is located, from among a plurality of motion vector resolution candidates, each set of the plurality of sets including one or more motion vector resolution candidates, wherein at least one of the plurality of sets of motion vector resolution candidates includes a plurality of motion vector resolution candidates; and
   encoding, into a bitstream, motion vector data determined for the motion vector of the current block according to a code table corresponding to the selected set of motion vector resolution candidates,
   wherein each motion vector resolution is a resolution of each motion vector, wherein the code table is selected from a plurality of code tables and each of the plurality of code tables includes a plurality of codewords corresponding to a plurality of motion vectors, and wherein the plurality of motion vectors included in each of the plurality of code tables corresponds to each of the plurality of sets of motion vector resolution candidates wherein the process of selecting the set of motion vector resolution candidates comprises calculating an encoding cost of the current block according to the one or more motion vector resolutions included in each set of the plurality of sets of motion vector resolution candidates, and selecting the set of motion vector resolution candidates having the lowest encoding cost among the encoding costs calculated for the plurality of sets of the motion vector resolution candidates.

13. The method of claim 12, wherein the process of determining the motion vector of the current block comprises estimating the motion vector of the current block for a motion vector resolution excluded in the selected set of motion vector resolution candidates, wherein the process of encoding the motion vector data comprises generating the bitstream including the encoded image data by prediction-encoding the current block by using the motion vector of the current block for the motion vector resolution excluded in the selected set of motion vector resolution candidates.

14. The method of claim 13, wherein the process of estimating the motion vector of the current block comprises estimating the motion vector for the motion vector resolution excluded in the selected set of motion vector resolution candidates by using template matching for searching for a reference block having adjacent pixels similar to adjacent pixels of the current block in a reference picture.

15. An apparatus for decoding a motion vector of a current block, the apparatus comprising:
    a resolution combination reconstructor configured to
        decode resolution combination index data extracted from a bitstream, and
        reconstruct a set of motion vector resolution candidates identified by the resolution combination index data from among a plurality of sets of motion vector resolution candidates, to be applied to an image area in which the current block is located, each set of the plurality of sets including one or more motion vector resolution candidates; and
    a motion vector reconstructor configured to
        decode motion vector data extracted from the bitstream, and
        reconstruct the motion vector of the current block from the motion vector data according to a code table corresponding to the reconstructed set of motion vector resolution candidates,
    wherein at least one of the plurality of sets of motion vector resolution candidates includes a plurality of motion vector resolution candidates,
    wherein each motion vector resolution is a resolution of each motion vector,
    wherein the code table is selected from a plurality of code tables and each of the plurality of code tables includes a plurality of codewords corresponding to a plurality of motion vectors, and
    wherein the plurality of motion vectors included in each of the plurality of code tables corresponds to each of the plurality of sets of motion vector resolution candidates.

16. An apparatus for decoding a current block, the apparatus comprising:
    a decoder configured to
        decode resolution combination index data extracted from a bitstream,
        reconstruct a set of motion vector resolution candidates identified by the resolution combination index data from among a plurality of sets of motion vector resolution candidates, to be applied to an image area in which the current block is located, each set of the plurality of sets of motion vector resolution candidates including one or more motion vector resolution candidates, wherein at least one of the plurality of sets of motion vector resolution candidates includes a plurality of motion vector resolution candidates,
        decode motion vector data extracted from the bitstream,
        reconstruct the motion vector of the current block from the motion vector data according to a code table corresponding to the reconstructed set of motion vector resolution candidates, and
        reconstruct a transformed and quantized residual image by decoding encoded image data extracted from the bitstream;
    an inverse quantizer/transformer configured to reconstruct a residual image by inversely quantizing and transforming the transformed and quantized residual image;
    a predictor configured to generate a predicted image of the current block by using the reconstructed motion vector; and
    an adder configured to reconstruct the current block by adding the residual image and the predicted image,
    wherein each motion vector resolution is a resolution of each motion vector,
    wherein the code table is selected from a plurality of code tables and each of the plurality of code tables includes a plurality of codewords corresponding to a plurality of motion vectors, and
    wherein the plurality of motion vectors included in each of the plurality of code tables corresponds to each of the plurality of sets of motion vector resolution candidates.

17. The apparatus of claim 16, wherein the predictor is configured to reconstruct the motion vector of the current block for a motion vector resolution excluded in the reconstructed set of motion vector resolution candidates by using template matching for searching for a reference block having adjacent pixels similar to adjacent pixels of the current block in a reference picture.

18. A method for decoding a motion vector of a current block, the method comprising:
    decoding resolution combination index data extracted from a bitstream;
    reconstructing a set of motion vector resolution candidates identified by the resolution combination index data from among a plurality of sets of motion vector resolution candidates, to be applied to an image area in which the current block is located, each set of the plurality of sets including one or more motion vector resolution candidates;
    decoding motion vector data extracted from the bitstream; and
    reconstructing the motion vector of the current block from the motion vector data according to a code table corresponding to the reconstructed set of motion vector resolution candidates,
    wherein at least one of the plurality of sets of motion vector resolution candidates includes a plurality of motion vector resolution candidates, wherein each motion vector resolution is a resolution of each motion vector, wherein the code table is selected from a plurality of code tables and each of the plurality of code tables includes a plurality of codewords corresponding to a plurality of motion vectors, and wherein the plurality of motion vectors included in each of the plurality of code tables corresponds to each of the plurality of sets of motion vector resolution candidates.

19. A method for decoding a current block, the method comprising:

decoding resolution combination index data extracted from a bitstream;

reconstructing a set of motion vector resolution candidates identified by the resolution combination index data from among a plurality of sets of motion vector resolution candidates, to be applied to an image area in which the current block is located, each set of the plurality of sets of motion vector resolution candidates including one or more motion vector resolution candidates, wherein at least one of the plurality of sets of motion vector resolution candidates includes a plurality of motion vector resolution candidates;

decoding motion vector data extracted from the bitstream;

reconstructing the motion vector of the current block from the motion vector data according to a code table corresponding to the reconstructed set of motion vector resolution candidates;

reconstructing a transformed and quantized residual image by decoding encoded image data extracted from the bitstream;

reconstructing a residual image by inverse-quantizing and transforming the transformed and quantized residual image;

generating a predicted image of the current block by using the reconstructed motion vector; and reconstructing the current block by adding the residual image and the predicted image, wherein each motion vector resolution is a resolution of each motion vector, wherein the code table is selected from a plurality of code tables and each of the plurality of code tables includes a plurality of codewords corresponding to a plurality of motion vectors, and wherein the plurality of motion vectors included in each of the plurality of code tables corresponds to each of the plurality of sets of motion vector resolution candidates.

20. The video decoding method of claim 19, wherein the process of reconstructing the motion vector of the current block comprises:

reconstructing the motion vector of the current block for a motion vector resolution excluded in the reconstructed set of motion vector resolution candidates by using template matching for searching for a reference block having adjacent pixels similar to adjacent pixels of the current block in a reference picture.

* * * * *